United States Patent
Clifford et al.

(10) Patent No.: US 9,874,883 B2
(45) Date of Patent: Jan. 23, 2018

(54) DIAPHRAGM INTERFACE APPARATUS TO IMPROVE A CYCLE LIFE OF A DIAPHRAGM

(75) Inventors: Jason David Clifford, Brooklyn Park, MN (US); Todd William Larsen, Milaca, MN (US); Brian James Tutt, Brainerd, MN (US)

(73) Assignee: TESCOM CORPORATION, Elk River, MN (US)

( * ) Notice: Subject to any disclaimer, the term of this patent is extended or adjusted under 35 U.S.C. 154(b) by 1011 days.

(21) Appl. No.: 13/052,475

(22) Filed: Mar. 21, 2011

(65) Prior Publication Data

US 2011/0174395 A1 Jul. 21, 2011

Related U.S. Application Data

(63) Continuation-in-part of application No. 12/496,868, filed on Jul. 2, 2009.

(51) Int. Cl.
*G05D 13/06* (2006.01)
*G05D 16/06* (2006.01)

(52) U.S. Cl.
CPC ..... *G05D 16/0633* (2013.01); *G05D 16/0663* (2013.01); *Y10T 137/7836* (2015.04)

(58) Field of Classification Search
CPC ............ G05D 16/063; G05D 16/0633; G05D 16/0663; F16K 15/021; F16K 15/025; F16K 17/04; F16K 17/044; F16K 7/12; Y10T 137/774; Y10T 137/7793; Y10T 137/7819; Y10T 137/7836; Y10T 137/7929

USPC ............ 137/454.6, 505.18, 505.38, 505.39, 137/505.41, 505.42
See application file for complete search history.

(56) References Cited

U.S. PATENT DOCUMENTS

| 330,263 A | 11/1885 | Robertson |
| 466,275 A | 12/1891 | Fasoldt |
| 1,045,791 A | 11/1912 | Hodge |

(Continued)

FOREIGN PATENT DOCUMENTS

| DE | 202004006191 | 8/2004 |
| EP | 0192625 | 8/1986 |

(Continued)

OTHER PUBLICATIONS

International Searching Authority, "International Search Report," issued in connection with international application serial No. PCT/US2012/026099, issued May 11, 2012, 2 pages.

(Continued)

*Primary Examiner* — William McCalister
(74) *Attorney, Agent, or Firm* — Hanley, Flight & Zimmerman, LLC

(57) ABSTRACT

Diaphragm interface apparatus to improve a cycle life of a diaphragm are described. An example fluid regulator includes a fluid flow passageway between an inlet and an outlet, where a sensing chamber defines a portion of the fluid flow passageway. A diaphragm senses a pressure in the sensing chamber and a diaphragm interface adjacent the sensing chamber has a curved surface to contact a portion of the diaphragm that moves in response to pressure changes in the sensing chamber. The curved surface affects an amount of stress imparted to the portion of the diaphragm during operation of the fluid regulator.

19 Claims, 7 Drawing Sheets

(56) References Cited

U.S. PATENT DOCUMENTS

| | | | |
|---|---|---|---|
| 1,286,397 A | 12/1918 | Olsen | |
| 1,452,252 A | 4/1923 | Müller | |
| 1,543,264 A | 9/1923 | Morgan | |
| 1,891,547 A | 12/1932 | Krichbaum | |
| 2,082,227 A | 6/1937 | Stettner | |
| 2,348,388 A | 5/1944 | Jenkins | |
| 2,612,728 A | 10/1946 | Jacobsson | |
| 2,521,637 A | 3/1949 | Lack | |
| 2,664,674 A | 1/1954 | Niesemann | |
| 2,667,127 A | 1/1954 | Rimann | |
| 2,707,966 A | 5/1955 | Taplin | |
| 2,806,481 A | 9/1957 | Faust | |
| 2,894,526 A | 7/1959 | Booth et al. | |
| 2,918,081 A | 12/1959 | Lauer, Jr. | |
| 2,942,624 A | 6/1960 | Good | |
| 3,113,756 A | 12/1963 | Griffo | |
| 3,120,377 A | 2/1964 | Lipschultz et al. | |
| 3,387,622 A | 6/1968 | Weinstein | |
| 3,434,395 A | 3/1969 | Londal | |
| 3,503,307 A | 3/1970 | Migdal | |
| 3,586,037 A | 6/1971 | Zimmer | |
| 3,667,722 A | 6/1972 | Katz et al. | |
| 3,819,286 A | 6/1974 | Bianchi | |
| 4,055,198 A | 10/1977 | Iannelli | |
| 4,196,744 A | 4/1980 | Bradshaw | |
| 4,457,329 A | 7/1984 | Werley et al. | |
| 4,471,802 A | 9/1984 | Pryor | |
| 4,543,832 A | 10/1985 | Van Over | |
| 4,624,442 A | 11/1986 | Duffy et al. | |
| 4,741,252 A | 5/1988 | Harter et al. | |
| 5,292,024 A | 3/1994 | Koefelda et al. | |
| 5,335,584 A | 8/1994 | Baird | |
| 5,443,083 A | 8/1995 | Gotthelf | |
| 5,449,003 A | 9/1995 | Sugimura | |
| 5,567,130 A | 10/1996 | Kvinge et al. | |
| 5,586,569 A | 12/1996 | Hanning et al. | |
| 5,615,701 A | 4/1997 | Yamabe et al. | |
| 5,725,007 A | 3/1998 | Stubbs | |
| 5,755,254 A * | 5/1998 | Carter et al. | 137/340 |
| 5,829,477 A | 11/1998 | Graham et al. | |
| 5,901,742 A | 5/1999 | Kleppner et al. | |
| 5,904,178 A * | 5/1999 | Bracey et al. | 137/505.42 |
| 5,950,652 A * | 9/1999 | Morgan | 137/14 |
| 5,950,692 A | 9/1999 | Georgs et al. | |
| 6,003,545 A | 12/1999 | Dukas et al. | |
| 6,019,121 A | 2/2000 | Uehara | |
| 6,039,071 A | 3/2000 | Tomita et al. | |
| 6,276,907 B1 | 8/2001 | Cooper et al. | |
| 6,536,466 B1 * | 3/2003 | Rockwell | 137/510 |
| 7,357,143 B2 * | 4/2008 | Cho et al. | 137/14 |
| 8,408,418 B2 | 4/2013 | Kuzelka | |
| 8,459,297 B2 | 6/2013 | Clifford | |
| 9,371,925 B2 | 6/2016 | Vasquez et al. | |
| 9,441,745 B2 | 9/2016 | Vasquez et al. | |
| 2005/0116427 A1 | 6/2005 | Seidel et al. | |
| 2006/0169328 A1 | 8/2006 | Cho et al. | |
| 2006/0289824 A1 | 12/2006 | Wincek | |
| 2009/0065073 A1 | 3/2009 | Davis | |
| 2009/0301582 A1 | 12/2009 | Wakeman | |
| 2009/0314359 A1 | 12/2009 | Woelfges | |
| 2011/0000553 A1 | 1/2011 | Clifford | |
| 2011/0174398 A1 | 7/2011 | Clifford et al. | |
| 2012/0241033 A1 | 9/2012 | Clifford et al. | |
| 2014/0034155 A1 | 2/2014 | Askew | |
| 2015/0034178 A1 | 2/2015 | Vasquez et al. | |
| 2015/0247582 A1 | 9/2015 | Vasquez et al. | |
| 2016/0239028 A1 | 8/2016 | Vasquez et al. | |

FOREIGN PATENT DOCUMENTS

| | | |
|---|---|---|
| EP | 0716230 | 6/1996 |
| EP | 0727603 | 6/1998 |
| FR | 2878985 | 6/2006 |
| GB | 335044 | 9/1930 |
| GB | 451379 | 8/1936 |
| GB | 521273 | 5/1940 |
| GB | 834574 | 5/1960 |
| GB | 1230715 | 5/1971 |
| GB | 2125938 | 3/1984 |
| GB | 2222869 | 3/1990 |
| GB | 2464283 | 4/2010 |
| WO | 9810208 | 3/1998 |
| WO | 2011002559 | 1/2011 |

OTHER PUBLICATIONS

International Searching Authority, "Written Opinion of the International Searching Authority," issued in connection with international application serial No. PCT/US2012/026099, issued May 11, 2012, 6 pages.

TESCOM, "44-1100 Series," Specifications, May 2007, 2 pages.

TESCOM, "44-1300 Series," Specifications, Jun. 2006, 2 pages.

TESCOM, "44-2200 Series," Specifications, Nov. 2010, 2 pages.

International Searching Authority, "International Search Report," issued in connection with international application serial No. PCT/US2012/025536, mailed May 22, 2012, 3 pages.

International Searching Authority, "Written Opinion of the International Searching Authority," issued in connection with international application serial No. PCT/US2012/025536, mailed May 22, 2012, 7 pages.

United States Patent and Trademark Office, "Requirement for Restriction/Election," issued in connection with U.S. Appl. No. 13/052,451, mailed on Jun. 12, 2013, 6 pages.

United States Patent and Trademark Office, "Office Action," issued in connection with U.S. Appl. No. 13/052,451, mailed on Jul. 23, 2013, 26 pages.

United States Patent and Trademark Office, "Requirement for Restriction/Election," issued in connection with U.S. Appl. No. 13/052,470, mailed on May 13, 2013, 9 pages.

The United States Patent and Trademark Office, "Final Office Action," issued in connection with U.S. Appl. No. 13/052,451, mailed on Dec. 30, 2013, 17 pages.

Emerson Process Management, "Type 95H," Fisher, Jan. 2007, 1 page.

United States Patent and Trademark Office, "Requirement for Restriction/Election," issued in connection with U.S. Appl. No. 12/496,868, mailed on Jan. 6, 2012, 7 pages.

United States Patent and Trademark Office, "Office Action," issued in connection with U.S. Appl. No. 12/496,868, mailed on Feb. 27, 2012, 21 pages.

United States Patent and Trademark Office, "Final Office Action," issued in connection with U.S. Appl. No. 12/496,868, mailed on Jul. 5, 2012, 17 pages.

United States Patent and Trademark Office, "Notice of Allowance and Fees Due," issued in connection with U.S. Appl. No. 12/496,868, mailed on Feb. 27, 2013, 13 pages.

International Searching Authority, "International Search Report," issued in connection with International Patent Application No. PCT/US2010/034798, mailed on Oct. 31, 2011, 4 pages.

International Searching Authority, "Written Opinion of the International Search Authority," issued in connection with International Patent Application No. PCT/US2010/034798, mailed on Oct. 31, 2011, 5 pages.

International Searching Authority, "International Preliminary Report on Patentability," issued in connection with International Patent Application No. PCT/US2010/034798, issued on Jan. 4, 2012, 6 pages.

United States Patent and Trademark Office, "Office Action," issued in connection with U.S. Appl. No. 13/052,470, mailed on Jun. 26, 2013, 24 pages.

United States Patent and Trademark Office, "Final Office Action," issued in connection with U.S. Appl. No. 13/052,470, mailed on Nov. 7, 2013, 17 pages.

United States Patent and Trademark Office, "Office Action," issued in connection with U.S. Appl. No. 13/052,470, mailed on Mar. 6, 2014, 26 pages.

(56) References Cited

OTHER PUBLICATIONS

United States Patent and Trademark Office, "Final Office Action," issued in connection with U.S. Appl. No. 13/052,451, mailed on Apr. 3, 2014, 14 pages.
United States Patent and Trademark Office, "Advisory Action," issued in connection with U.S. Appl. No. 13/052,451, mailed on Jun. 13, 2014, 4 pages.
United States Patent and Trademark Office, "Final Office Action," issued in connection with U.S. Appl. No. 13/052,470, mailed on Jul. 25, 2014, 28 pages.
United States Patent and Trademark Office, "Office Action," issued in connection with U.S. Appl. No. 13/052,451, mailed on Jul. 24, 2014, 22 pages.
United States Patent and Trademark Office, "Non-Final Office Action", issued in connection with U.S. Appl. No. 15/139,898, on May 4, 2017 (12 pages).
United States Patent and Trademark Office, "Notice of Allowance and Fee(s) Due", issued in connection with U.S. Appl. No. 15/139,898, dated Nov. 3, 2017, 9 pages.
The United States Patent and Trademark Office, "Final Office Action," issued in connection with U.S. Appl. No. 13/052,451, dated Dec. 22, 2014, 12 pages.
The United States Patent and Trademark Office, "Advisory Action," issued in connection with U.S. Appl. No. 13/052,451, dated Mar. 12, 2015, 3 pages.
The United States Patent and Trademark Office, "Non-Final Office Action," issued in connection with the U.S. Appl. No. 14/195,450, dated Aug. 11, 2015, 12 pages.
The United States Patent and Trademark Office, "Notice of Allowance", issued in connection with U.S. Appl. No. 14/195,450, dated Feb. 1, 2016, 5 pages.
The United States Patent and Trademark Office, "Office Action," issued in connection with U.S. Appl. No. 13/052,470, dated Nov. 3, 2014, 16 pages.
The United States Patent and Trademark Office, "Final Office Action," issued in connection with U.S. Appl. No. 13/052,470, dated Apr. 29, 2015, 15 pages.
Patent Cooperation Treaty, "International Preliminary Report on Patentability", issued in connection with PCT Application No. PCT/US2014/049030, dated Feb. 2, 2016, Patentscope, 6 pages.
Patent Cooperation Treaty, "Written Opinion", issued in connection with PCT Application No. PCT/US2015/032919, dated May 10, 2016, 10 pages.
The United States Patent and Trademark Office, "Non-Final Office Action," issued in connection with U.S. Appl. No. 13/954,527, dated Feb. 13, 2015, 14 pages.
The United States Patent and Trademark Office, "Final Office Action," issued in connection with U.S. Appl. No. 13/954,527, dated May 29, 2015, 13 pages.
The United States Patent and Trademark Office, "Advisory Action," issued in connection with U.S. Appl. No. 13/954,527, dated Jul. 31, 2015, 4 pages.
The United States Patent and Trademark Office, "Non-Final Office Action," issued in connection with U.S. Appl. No. 13/954,527, dated Sep. 11, 2015, 22 pages.
The United States Patent and Trademark Office, "Corrected Notice of Allowance," issued in connection with U.S. Appl. No. 13/954,527, dated Jan. 8, 2016, 4 pages.
The United States Patent and Trademark Office, "Notice of Allowance and Fees Due," issued in connection with U.S. Appl. No. 13/954,527, dated Feb. 22, 2016, 7 pages.
The United States Patent and Trademark Office, "Corrected Notice of Allowance," issued in connection with U.S. Appl. No. 13/954,527, dated Apr. 29, 2016, 4 pages.
The United States Patent and Trademark Office, "Non-Final Office Action," issued in connection with U.S. Appl. No. 13/052,451, dated Jul. 23, 2013, 18 pages.
The United States Patent and Trademark Office, "Notice of Allowance", issued in connection with U.S. Appl. No. 14/195,450, dated Aug. 3, 2016, 7 pages.
Patent Cooperation Treaty, "International Search Report", issued in connection with PCT Application No. PCT/US2015/032919, dated May 10, 2016, 8 pages.
European Patent Office, "Communication Pursuant to Article 94(3) EPC," issued in connection with European Patent Application No. 12706975.5, dated Nov. 4, 2014, 7 pages.
European Patent Office, "Communication Pursuant to Article 94(3) EPC," issued in connection with European Patent Application No. 12706976.3, dated Nov. 10, 2014, 7 pages.
International Searching Authority, "International Search Report," issued in connection with international application serial No. PCT/US2014/049030, dated Oct. 21, 2014, 3 pages.
International Searching Authority, "Written Opinion of the International Searching Authority," issued in connection with international application serial No. PCT/US2014/049030, dated Oct. 21, 2014, 5 pages.
The United States Patent and Trademark Office, "Final Office Action," issued in connection with U.S. Appl. No. 14/195,450, dated Dec. 18, 2015, 12 pages.
"Flat", Merriam-Webster, Jul. 2015, 8 pages.
Patent Cooperation Treaty, "Invitation to Pay Additional Fees", issued in connection with PCT Application No. PCT/US2015/032919, dated Sep. 11, 2015, 4 pages.
Patent Cooperation Treaty, "Written Opinion", issued in connection with international application No. PCT/US2014/049030, dated Feb. 11, 2016, 6 pages.

\* cited by examiner

DIAPHRAGM INTERFACE APPARATUS TO IMPROVE A CYCLE LIFE OF A DIAPHRAGM

CROSS-REFERENCE TO RELATED APPLICATIONS

This patent arises as a continuation-in-part of U.S. patent application Ser. No. 12/496,868, filed on Jul. 2, 2009, entitled "BALANCED VALVE CARTRIDGE," which is incorporated herein by reference in its entirety.

FIELD OF THE DISCLOSURE

This patent relates generally to fluid regulators and, more particularly, to diaphragm interface apparatus to improve a cycle life of a diaphragm.

BACKGROUND

Fluid regulators are commonly distributed throughout process control systems to control the pressures of various fluids (e.g., liquids, gasses, etc.). Fluid regulators are typically used to regulate the pressure of a fluid to a substantially constant value. Specifically, a fluid regulator has an inlet that typically receives a supply fluid at a relatively high pressure and provides a relatively lower and substantially constant pressure at an outlet. To regulate the downstream pressure, fluids regulators commonly include a sensing element or diaphragm to sense an outlet pressure in fluid communication with a downstream pressure. Elastomeric diaphragms are cost effective and are typically used with low-pressure applications or non-corrosive process fluids. For high-purity applications, high-pressure applications or highly corrosive process fluids, fluid regulators often employ a metal diaphragm (e.g., a stainless steel diaphragm).

To couple a metal diaphragm to a fluid regulator, conventional fluid regulators clamp a peripheral edge of a metal diaphragm between a regulator valve body and a bonnet. Such a clamped connection localizes deformation and stresses on the metal diaphragm. Further, to provide support to the metal diaphragm, fluid regulators typically employ a back-up plate having a substantially flat or planar contact surface that engages the metal diaphragm. However, some metal diaphragms include convolutions or wave-shaped contours to increase a sensitivity of the diaphragm. A backup plate having a substantially planar contact surface engages a diaphragm having convolutions with a relatively small contact area, thereby increasing stress concentration on the metal diaphragm at the areas of contact. Such localized stress concentrations imparted to the diaphragm can significantly reduce the cycle life or fatigue life of the metal diaphragm, thereby causing increased maintenance and costs.

SUMMARY

In one example, a fluid regulator includes a fluid flow passageway between an inlet and an outlet, where a sensing chamber defines a portion of the fluid flow passageway. A diaphragm senses a pressure in the sensing chamber and a diaphragm interface adjacent the sensing chamber has a curved surface to contact a portion of the diaphragm that moves in response to pressure changes in the sensing chamber. The curved surface affects an amount of stress imparted to the portion of the diaphragm during operation of the fluid regulator.

In another example, a fluid regulator includes a diaphragm support disposed between a bonnet and a valve body to support a movable portion of a diaphragm of the fluid regulator. The diaphragm support a curved surface that is substantially complementary to a curved surface of a face of the movable portion of the diaphragm to increase a contact surface area between the diaphragm support and the movable portion of the diaphragm during operation.

DETAILED DESCRIPTION

Example fluid regulators described herein substantially improve a cycle life or fatigue life of a sensing element or diaphragm. More specifically, the example fluid regulators described herein include one or more diaphragm interfaces or diaphragm supports to reduce localized deformation or stress concentrations to portions of the diaphragm that move (e.g., flex or bend) during operation of the fluid regulator.

An example fluid regulator described herein includes a diaphragm interface adjacent a sensing chamber of the fluid regulator. The diaphragm interface has a curved surface to contact a portion of the diaphragm that moves in response to pressure changes in the sensing chamber. The curved surface affects an amount of stress imparted to the movable portion of the diaphragm during operation. In particular, the curved surface described herein engages such movable diaphragm portions with increased contact surface area to distribute stresses across a larger portion of the diaphragm thereby reducing localized stress concentrations to the portions of the diaphragm that move during operation.

In some examples described herein, a curved surface of a diaphragm interface comprises a face or engagement surface having a curved profile complementary to a profile of a portion of a diaphragm in which the diaphragm interface engages during operation. For example, a diaphragm interface of a fluid regulator described herein includes a support or contact surface that has a cross-sectional shape or profile that is substantially similar to a cross-sectional shape or profile of a diaphragm to substantially increase a contact surface area between the diaphragm interface and the diaphragm. In other words, the contact surface is configured or shaped to substantially, matably engage the diaphragm when the diaphragm bends or flexes to engage the diaphragm interface. As a result, the increased contact surface area between the diaphragm interface of the fluid regulator and the diaphragm reduces stress concentrations by distributing stresses imparted on the diaphragm across a greater area or portion of the diaphragm, thereby significantly reducing localized stresses or fatigue deformation of the diaphragm. As a result, the diaphragm interface significantly improves the cycle life or fatigue life of the diaphragm.

Figure 1A:
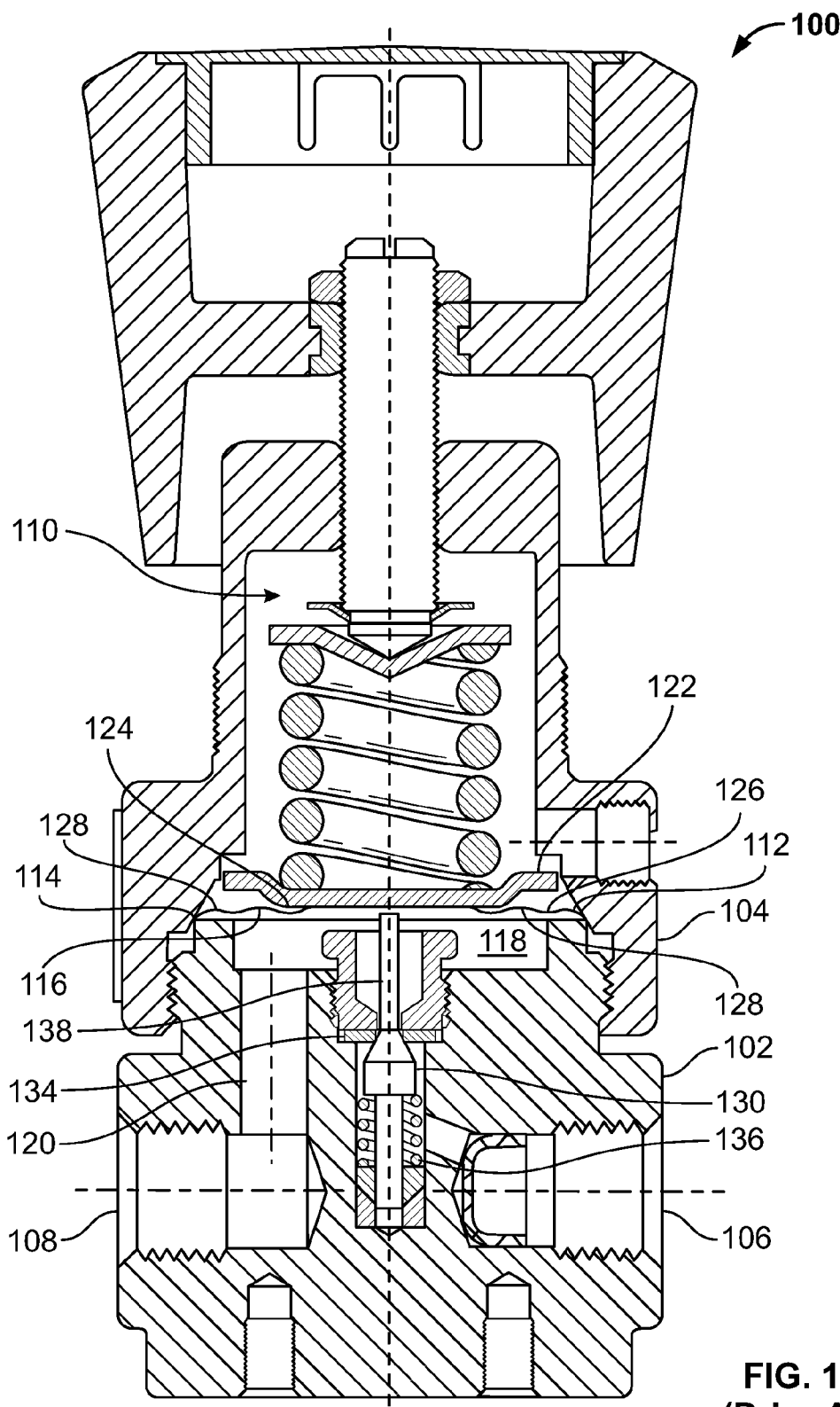
FIG. 1A illustrates a known fluid regulator.
Figure 1B:
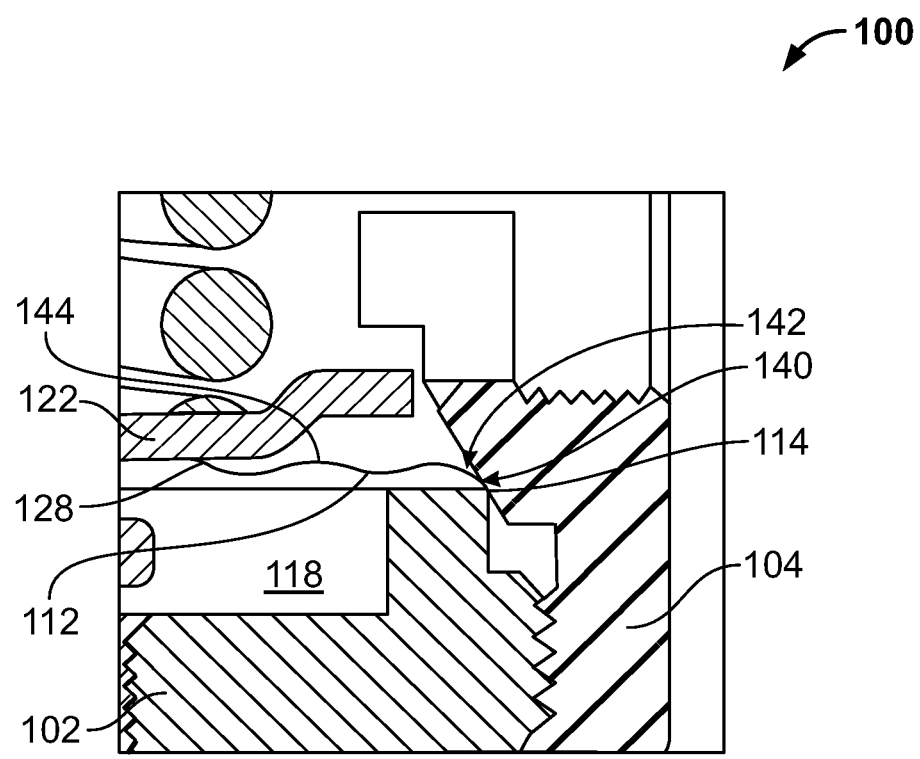
FIG. 1B illustrates an enlarged view of a portion of the known fluid regulator of FIG. 1A

Before discussing the example fluid regulator described herein, a brief description of a known fluid regulator 100 is provided in FIGS. 1A and 1B. Referring to FIGS. 1A and 1B, the example fluid regulator 100 includes a valve body 102 threadably coupled to a bonnet 104 that defines a fluid passageway between an inlet 106 and an outlet 108. A load assembly 110 is disposed within the bonnet 104 and is adjustable to provide a load to a diaphragm 112, where the load corresponds to a desired fluid outlet pressure. A peripheral edge 114 of the diaphragm 112 is clamped or captured between the bonnet 104 and the valve body 102 such that a first side 116 of the diaphragm 112 and the valve body 102 define a sensing chamber 118 that is in fluid communication with the outlet 108 via a passageway 120. Further, to provide support to the diaphragm 112, the fluid regulator 100 includes a back-up plate 122 having a substantially flat or planar contact surface 124 that engages a portion of a second side 126 of the diaphragm 112. The diaphragm 112 is a metal diaphragm having a plurality of wave-shaped contours or convolutions 128 to increase a sensitivity of the diaphragm 112. A poppet 130 moves relative to a valve seat 134 to regulate or throttle the flow of fluid between the inlet 106 and the outlet 108. A biasing element 136 biases the poppet 130 toward the valve seat 134. The poppet 130 also includes a stem 138 to engage the diaphragm 112 and the back-up plate 122.

In operation, the diaphragm 112 and the back-up plate 122 move away from the stem 138 when a fluid pressure at the outlet 108 provides a force to the first side 116 of the diaphragm 112 that is greater than or equal to the force provided by the load assembly 110 to the second side 126 of the diaphragm 112. As a result, the poppet 130 sealingly engages the valve seat 134 to restrict fluid flow between the inlet 106 and the outlet 108. When the fluid pressure at the outlet 108 decreases so that the force provided to the first side 116 of the diaphragm 112 is less than the force provided to the second side 126 of the diaphragm 112 by the load assembly 110, the diaphragm 112 flexes or moves toward the valve body 102 and engages the poppet stem 138, which causes the poppet 130 to move away from the valve seat 134 to allow fluid flow between the inlet 106 and the outlet 108. The pressurized fluid flows between the inlet 106 and the outlet 108 until the forces on the sides 116 and 126 of the diaphragm 112 are balanced.

As most clearly shown in FIG. 1B, the peripheral edge 114 of the diaphragm 112 is clamped between the bonnet 104 and the valve body 102 at a pinch point or area 140. Such a clamped connection is disadvantageous because it generates relatively high stress concentration at an area or point 142 immediately adjacent the pinch point 140 when the diaphragm 112 flexes or bends during operation. In other words, the area 142 of the diaphragm 112 bends or flexes (i.e., moves during operation) while subjected to a relatively high stress concentration, which may cause the area 142 to fracture or fatigue during operation. As a result, the highly concentrated or localized stresses may reduce or limit the cycle life or fatigue life of the diaphragm 112.

Additionally, although not shown, in some known examples, the planar contact surface 124 of the back-up plate 122 engages the wave-shaped contours 128 of the diaphragm 112 when the diaphragm 112 moves relative the valve seat 134. In particular, because the contact surface 124 of the back-up plate 122 is substantially flat, the contact surface 124 engages the diaphragm 112 via peaks 144 of the wave-shaped contours 128 of the diaphragm 112. Thus, the back-up plate 122 engages the peaks of the wave-shaped contours 128 with a relatively small contact surface area. As a result, the back-up plate 122 may cause increased or localized stress concentration to be imparted on the diaphragm 112 via the peaks 144. As noted above, such localized stresses can cause the diaphragm 112 to fracture or fatigue, thereby reducing the cycle life or fatigue life of the diaphragm 112 and increasing maintenance costs.

Figure 2A:
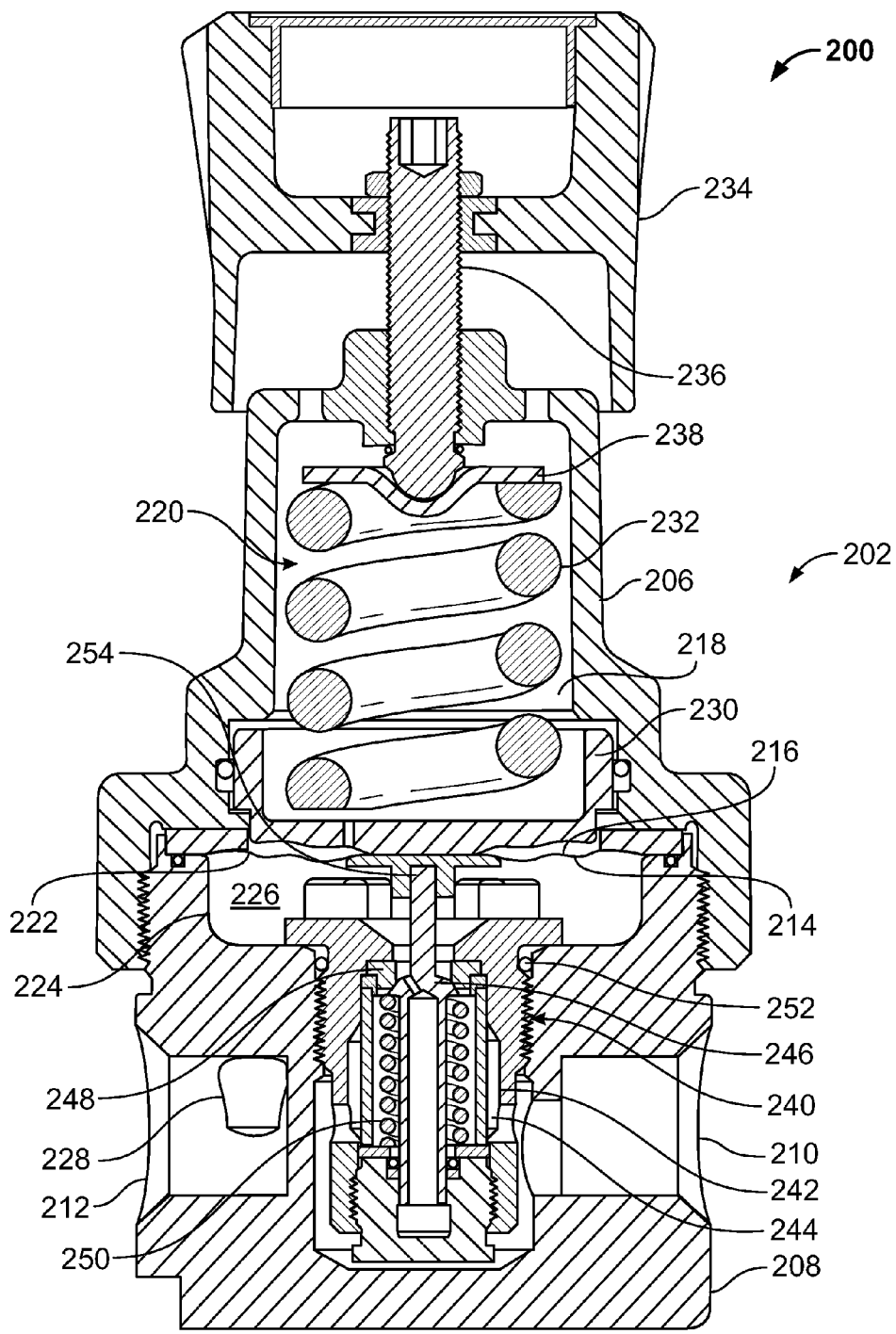
FIG. 2A illustrates an example fluid regulator described herein having a metal diaphragm and shown in a closed position.
Figure 2B:
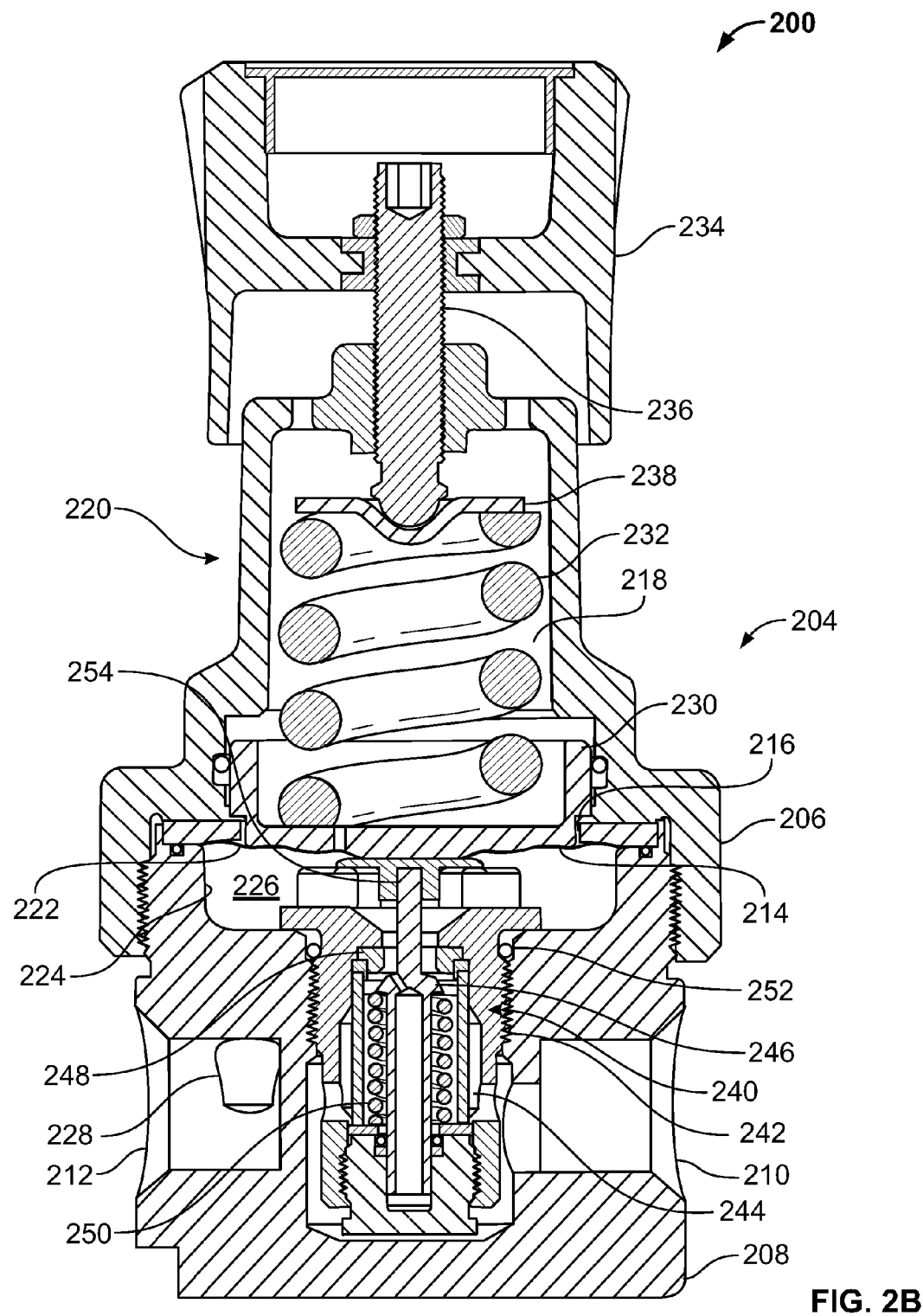
FIG. 2B illustrates the example fluid regulator of FIG. 2A shown in an open position.

FIGS. 2A and 2B illustrate an example fluid regulator 200 described herein. FIG. 2A illustrates the example fluid regulator 200 in a closed position 202 and FIG. 2B illustrates the example fluid regulator 200 in an open position 204.

Referring to FIGS. 2A and 2B, the example fluid regulator 200 includes a regulator body having an upper body portion or bonnet 206 coupled (e.g., threadably coupled) to a lower body portion or valve body 208. The valve body 208 forms a fluid flow path between an inlet 210 and an outlet 212 of the fluid regulator 200. A diaphragm 214 is captured between the valve body 208 and the bonnet 206 so that a first side 216 of the diaphragm 214 and the bonnet 206 define a load chamber 218 to receive a load assembly 220. A second side 222 of the diaphragm 214 and an inner surface 224 of the valve body 208 define a sensing chamber 226. The sensing chamber 226 is fluidly coupled to the outlet 212 via a passage 228 and senses the pressure of the fluid at the outlet 212. In the illustrated example, the diaphragm 214 is a metal diaphragm composed of, for example, stainless steel.

The load assembly 220 is operatively coupled to the diaphragm 214 via a diaphragm plate or back-up plate 230 and provides a reference force or load (e.g., a pre-set force) to the diaphragm 214. In this example, the load assembly 220 includes a biasing element 232 (e.g., a spring) disposed within the load chamber 218 that provides a load to the diaphragm 214 via the back-up plate 230. A spring adjuster 234 adjusts (e.g., increases or decreases) the amount of a preset force or load that the biasing element 232 exerts on the first side 216 of the diaphragm 214. As shown, the spring adjustor 234 includes a control knob keyed to a screw 236 that is threadably coupled to the bonnet 206 and engages an adjustable spring seat 238. Rotation of the control knob in a first direction (e.g., a clockwise direction) or a second direction (e.g., a counterclockwise direction) varies the amount of compression of the biasing element 232 (e.g., compresses or decompresses the biasing element 232) and, thus, the amount of load exerted on the first side 216 of the diaphragm 214.

A valve apparatus or valve cartridge assembly 240 is disposed within a bore 242 of the valve body 208 that defines an inlet chamber 244 fluidly coupled to the inlet 210. The valve apparatus 240 includes a poppet 246 that moves toward a valve seat 248 to restrict fluid flow between the inlet 210 and the outlet 212 when the fluid regulator 200 is in the closed position 202. The poppet 246 moves away from the valve seat 248 to allow fluid flow between the inlet 210 and the outlet 212 when the fluid regulator 200 is in the open position 204. A biasing element 250 biases the poppet 246 toward the valve seat 248. A seal 252 (e.g., an O-ring) is disposed between the valve apparatus 240 and the valve body 208 of the fluid regulator 200 to provide a seal between the sensing chamber 226 and the inlet chamber 244.

In operation, the example fluid regulator 200 fluidly couples to, for example, an upstream pressure source providing a relatively high pressure fluid (e.g., a gas) via the inlet 210 and fluidly couples to, for example, a low pressure downstream device or system via the outlet 212. The fluid regulator 200 regulates the outlet pressure of the fluid flowing through the fluid regulator 200 to a desired pressure corresponding to the preset load provided by the adjustable load assembly 220.

To achieve a desired outlet pressure, the control knob is rotated (e.g., in a clockwise or counterclockwise direction) to increase or decrease the load exerted by the biasing element 232 on the first side 216 of the diaphragm 214. The load provided by the biasing element 232 is adjusted to correspond to a desired outlet pressure. With the reference pressure set, the sensing chamber 226 senses a pressure of the pressurized fluid at the outlet 212 via the passage 228, which causes the diaphragm 214 to move in response to pressure changes in the sensing chamber 226.

For example, as the fluid flows between the inlet 210 and the outlet 212, the pressure of the fluid at the outlet 212 increases. As the pressure of the pressurized fluid in the sensing chamber 226 increases, the pressure of the fluid exerts a force on the second side 222 of the diaphragm 214 to cause the diaphragm 214 and the biasing element 232 to move in a rectilinear motion away from the valve body 208. In turn, the biasing element 250 of the valve apparatus 240 causes the poppet 246 to move toward the valve seat 248 to restrict fluid flow between the inlet 210 and the outlet 212. A pressure of the fluid in the sensing chamber 226 that exerts a force on the second side 222 of the diaphragm 214 that is greater than the reference pressure or force exerted by the load assembly 220 on the first side 216 of the diaphragm 214 causes the back-up plate 230 to move away from the valve body 208 to allow the poppet 246 to sealingly engage the valve seat 248 to restrict or prevent fluid flow through the fluid regulator 200 as shown in FIG. 2A.

When the pressure of the pressurized fluid in the sensing chamber 226 is less than the reference pressure or force exerted by the biasing element 232 on the first side 216 of the diaphragm 214, the diaphragm 214 moves, bends or flexes toward the valve body 208. In turn, the back-up plate 230 engages a stem portion 254 of the poppet 246 to move the poppet 246 away from the valve seat 248 to allow or increase fluid flow between the inlet 210 and the outlet 212. The poppet 246 moves toward the valve seat 248 to prevent or restrict fluid flow between the inlet 210 and the outlet 212 when the pressure differential across the diaphragm 214 is substantially near zero (i.e., the pressure of the fluid in the sensing chamber 226 is regulated to a pressure that generates a force substantially equal to the load provided by the load assembly 220).

During operation as shown in FIGS. 2A and 2B, the diaphragm 214 moves flexes, or bends between a first position shown in FIG. 2A to move the poppet 246 toward the closed position 202 and a second position shown in FIG. 2B to move the poppet 246 toward the open position 204.

Figure 3A:
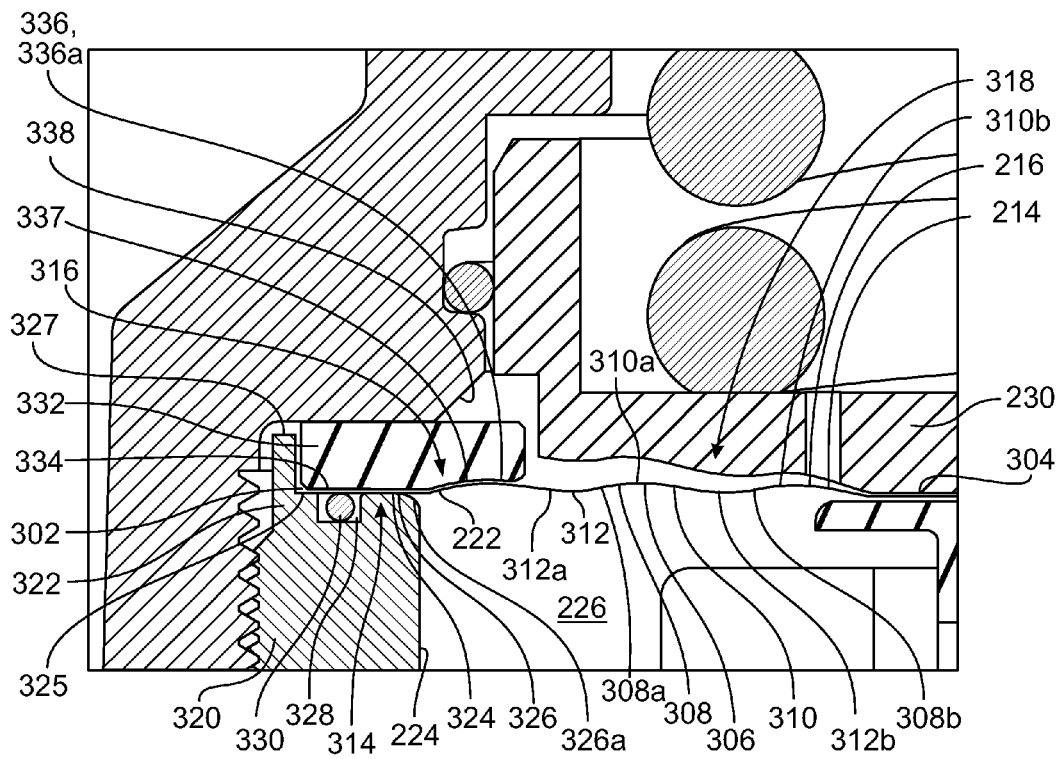
FIG. 3A is an enlarged view of a portion of the example fluid regulator of FIGS. 2A and 2B.
Figure 3B:
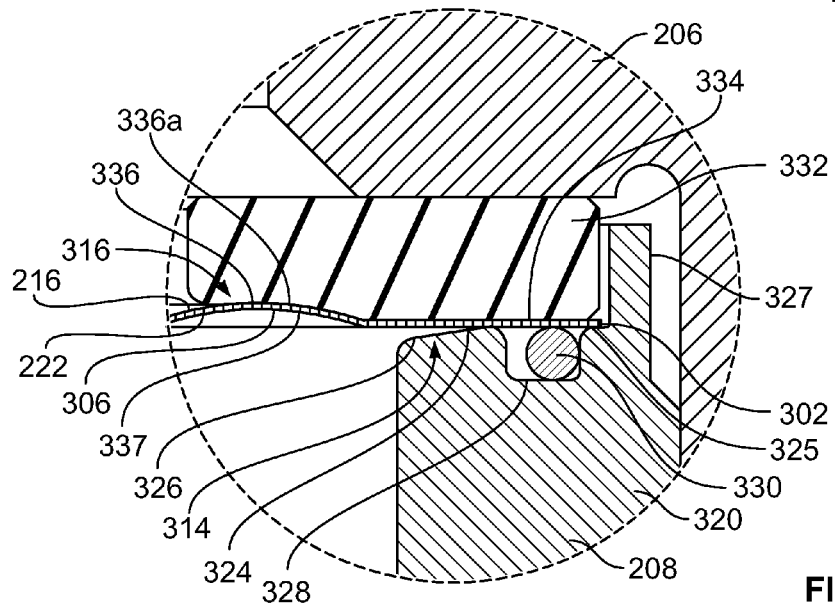
FIG. 3B is another enlarged view of a portion of the example fluid regulator of FIGS. 2A, 2B and 3A.

FIGS. 3A and 3B illustrate enlarged portions of the fluid regulator 200 of FIGS. 2A and 2B. As most clearly shown in FIGS. 3A and 3B, the diaphragm 214 of the illustrated example includes a peripheral edge 302, a central portion 304, and an intermediate, movable or flexible portion 306 between the peripheral edge 302 and the central portion 304. Each of the peripheral edge 302 and the central portion 304 has a substantially planar or flat surface. The intermediate portion 306 has a plurality of wave-shaped contours or convolutions 308 that flex or bend when the diaphragm 214 moves between the first and second positions shown in FIGS. 2A and 2B. In particular, each of the contours 308 of the intermediate portion 306 includes a convex portion or curved surface 310 and a concave portion or curved surface 312 that form a continuous smooth curve or wave-shaped contour or convolution 308. Each of the convex portions 310 and/or the concave portions 312 may have substantially similar radius of curvatures or may have varying radius of curvatures. For example, a first convex portion 310a and/or concave portion 312a of a contour 308a may have a first radius of curvature and a second convex portion 310b and/or concave portion 312b of a contour 308b may have a second radius of curvature different from the first radius of curvature. The contours 308 significantly increase the sensitivity of the diaphragm 214 to enable the fluid regulator 200 to have a more compact dimensional envelope. The diaphragm 214 is composed of a metallic material such as, for example, stainless steel.

To reduce stress concentration on the intermediate portion 306 of the diaphragm 214, the fluid regulator 200 includes one or more diaphragm interfaces or support surfaces 314, 316 and/or 318 adjacent the sensing chamber 226. Each of the diaphragm interfaces 314, 316 and/or 318 increases the cycle life or fatigue life of the diaphragm 214. In particular, each of the diaphragm interfaces 314, 316 and/or 318 substantially increases a contact surface area when engaged with the diaphragm 214, thereby reducing the stress concentrations on the diaphragm 214 during operation. In some examples, a fluid regulator only employs one of the diaphragm interfaces 314, 316 or 318. However, any combination of the interfaces 314, 316 and 318 may be used.

In the illustrated example, the diaphragm interface 314 is integrally formed with the valve body 208 as a unitary piece or structure. As shown, the valve body 208 has an annular wall 320 that defines the diaphragm interface 314 at an upper edge or portion 322 of the annular wall 320 adjacent the inner surface 224. The diaphragm interface 314 of the valve body 208 includes a ring-shaped seat or diaphragm mount 324 to hold, receive or engage the peripheral edge 302 of the diaphragm 214. The ring-shaped seat 324 includes a curved, slanted or ramped surface 326 that includes a rounded or radiused edge 326a adjacent the diaphragm mount 324 to support a portion of the peripheral edge 302 and/or the intermediate portion 306 of the diaphragm 214 that moves or flexes during operation of the fluid regulator 200.

The diaphragm mount 324 has a substantially planar or flat surface to receive or engage the peripheral edge 302 of the diaphragm 214. As shown, the diaphragm mount 324 is substantially perpendicular to the inner surface 224. The ramped portion 326 and radiused edge 326a are located between the diaphragm mount 324 and the inner surface 224. The ramped portion 326 may include a curved surface having uniform radius of curvature or a plurality of curved surfaces having varying radii of curvatures that form a continuous ramped portion. The ramped portion 326 and/or the diaphragm mount 324 provide a substantially tight metal-to-metal seal when the diaphragm 214 is coupled to the fluid regulator 200. In some examples, to facilitate a metal-to-metal seal, a shoulder 325 of the diaphragm mount 324 adjacent a stepped, annular wall 327 of the valve body 208 is offset (e.g., a 0.015 inch offset) relative to the ramped portion 326 (e.g., lower than the ramped portion 326 in the orientation of FIG. 3A). In this manner, when the bonnet 206 coupled to the valve body 208, a torque applied to the ramped portion 326 of the valve body 208 causes at least a portion of the ramped surface 326 to deform or flatten to provide a substantially tight metal-to-metal seal. The valve body 208 may be composed of a relatively softer material than the material of the diaphragm 214.

In operation, the ramped portion 326 enables a portion of the diaphragm 214 adjacent the peripheral edge 302 to flex or roll along the ramped portion 326. For example, when the intermediate portion 306 of the diaphragm 214 adjacent the peripheral edge 302 moves or flexes toward the valve body 208 to the second position (e.g., the position of FIG. 2B), the second side 222 of the intermediate portion 306 adjacent the peripheral edge 302 engages the ramped portion 326 of the valve body 208. The ramped portion 326 increases the contact surface area between the intermediate portion 306 and the valve body 208 to more evenly distribute or reduce stresses imparted to the intermediate portion 306 across the area or portion of the diaphragm 214 that engages or rolls about the ramped portion 326. In other words, the ramped or curved surface 326 enables the intermediate portion 306 adjacent the peripheral edge 302 to flex or bend while subjected to significantly reduced stress concentration.

For example, in contrast to the known fluid regulator 100 of FIGS. 1A and 1B, the diaphragm interface 314 or ramped portion 326 of the valve body 208 significantly reduces or eliminates a pinch point or area (e.g., the pinch point 140 of FIGS. 1A and 1B) between the valve body 208 and the bonnet 206. The ramped portion 326 enables a larger portion or area of the diaphragm 214 adjacent the peripheral edge 302 to roll or flex about the ramped portion 326 with less rigidity or stiffness compared to the pinch point 140 of FIG. 1B, thereby reducing concentration of stresses by distributing the stresses over a larger contact surface area of the diaphragm 214 adjacent the peripheral edge 302. In other words, the diaphragm 214 bends about the ramped portion 326 with less compressive stress imparted to the second side 222 of the diaphragm 214 and less tensile stress imparted to the first side 216 of the diaphragm 214 compared to the compressive and tensile stresses imparted to the diaphragm 112 of the fluid regulator 100 of FIGS. 1A and 1B when the diaphragm 112 bends about the pinch point 140. Thus, the ramped portion 326 increases a contact surface area between the valve body 208 and the intermediate portion 306, thereby reducing stress concentration across the intermediate portion 306 of the diaphragm 214 adjacent the peripheral edge 302. The ramped portion 326 may be formed via machining, casting or any other suitable manufacturing process(es). As shown, to provide a redundant seal and/or to facilitate assembly when a substantially tight metal-to-metal seal is not required, the diaphragm interface 314 or diaphragm mount 324 may optionally include a recess 328 to receive an O-ring 330 to provide a seal (e.g., a redundant seal) between the valve body 208 and the bonnet 206. The O-ring 330 may facilitate assembly because it requires less torque to provide a seal compared to a torque required to provide a metal-to-metal seal.

In the illustrated example, the fluid regulator 200 employs a ring-shaped clamp or retainer 332 to hold or clamp the diaphragm 214 between the bonnet 206 and the valve body 208. Also, the retainer 332 defines the diaphragm interface 316 that provides support to the intermediate portion 306 adjacent the peripheral edge 302. The diaphragm interface 316 includes a diaphragm clamping portion 334 and a diaphragm support portion 336 adjacent the diaphragm clamping portion 334.

As shown, the peripheral edge 302 of the diaphragm 214 is clamped between the diaphragm clamping portion 334 and the diaphragm mount 324 of the valve body 208. In particular, the diaphragm clamping portion 334 of the retainer 332 transfers a load to the peripheral edge 302 of the diaphragm 214 when the valve body 208 is coupled to the bonnet 206 to help provide a metal-to-metal seal between the diaphragm 214 and the valve body 208 when a torque is applied to the bonnet 206 during assembly of the bonnet 206 and the valve body 208. When coupled to the valve body 208, the bonnet 206 provides a compressive load to the peripheral edge 302 of the diaphragm 214 via the retainer 332. In this example, the retainer 332 is composed of, for example, a metallic material such as stainless steel to provide a metal-to-metal contact between the retainer 332, the valve body 208, the bonnet 206 and the diaphragm 214.

The diaphragm support portion 336 of the diaphragm interface 316 includes a curved or arcuate surface 336a that protrudes away from the diaphragm clamping portion 334 and inwardly from the peripheral edge 302 toward the sensing chamber 226. For example, the diaphragm support portion 336 extends beyond or past the inner surface 224 or upper edge 322 of the annular wall 320 of the valve body 208. Such an extension enables the diaphragm support portion 336 to engage the first side 216 of the intermediate portion 306 adjacent the peripheral edge 302 to support the diaphragm 214. In particular, the diaphragm support portion 336 engages at least a portion 337 of the concave portion 310 of the contour 308 of the first side 216 of the diaphragm 214. Thus, the retainer 332 or the diaphragm interface 316 and the ramped portion 326 or diaphragm interface 314 engage opposing faces or sides 216 and 222, respectively, of the diaphragm 214. Further, as shown, in FIGS. 3A and 3B, the curved surface 336a has a shape or profile substantially similar to the shape or profile of the intermediate portion 306 adjacent the peripheral edge 302 such that the curved surface matably engages the intermediate portion 306 adjacent the peripheral edge 302.

Figure 4:
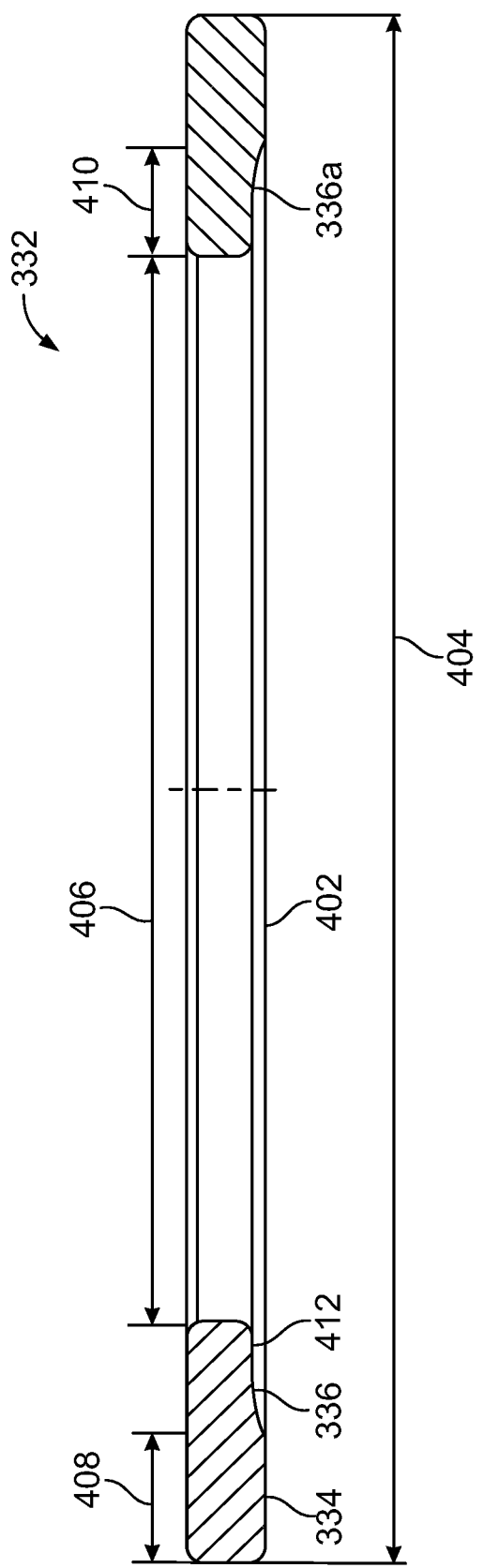
FIG. 4 illustrates an example retainer described herein of the example fluid regulator of FIGS. 2A, 2B, 3A and 3B.

FIG. 4 depicts a cross-section of the retainer 332 of FIGS. 3A and 3B. Referring also to FIG. 4, the retainer 332 is a ring-shaped clamp 402 having an outer diameter 404 and an inner diameter 406. For example, the outer diameter 404 may be approximately 64.5 millimeters and the inner diameter 406 is approximately 44.5 millimeters. In this example, the diaphragm clamping portion 334 has a length 408 and the diaphragm support portion 336 has a length 410. For example, the length 408 is approximately 5.25 millimeters and the length 410 is approximately 4.75 millimeters. However, other lengths and/or diameters may be used to suit the needs of a particular application.

Also, in the illustrated example, the curved surface of the diaphragm support portion 336 has a radius of curvature 412 that is substantially similar to a radius of curvature of the intermediate portion 306 adjacent the peripheral edge 302. Thus, the curved surface 336a may have a curved profile that is complementary to a curved profile of the intermediate portion 306 adjacent the peripheral edge 302. For example, the radius 412 of the curved surface is approximately 8.5 millimeters. However, the radius of curvature may be varied as needed to suit the needs of a particular application.

In this manner, the curved surface 336a engages the intermediate portion 306 adjacent the peripheral edge 302 with a relatively greater contact surface area compared to, for example, the fluid regulator 100 of FIGS. 1A and 1B, thereby reducing stress concentration at the intermediate portion 306 adjacent the peripheral edge 302 when the diaphragm 214 moves between the first and second positions during operation. For example, the retainer 332 significantly reduces high compressive stress concentrations on the first side 216 of the diaphragm 214 and high tensile stress concentrations on the second side 222 of the diaphragm 214 when a pressure or force is applied to the second side 222 of the diaphragm 214 via the sensing chamber 226 compared to the compressive and tensile stresses imparted to the diaphragm 112 of the fluid regulator 100 of FIGS. 1A and 1B when the diaphragm 112 bends about the pinch point 140. As a result, the diaphragm interface 316 significantly improves the cycle life or fatigue life of the diaphragm 214. In other examples, the curved surface 336a may have a radius of curvature that is different than the radius of curvature of the intermediate portion 306 of the diaphragm 214.

Although not shown, the retainer 332 and/or the diaphragm interface 316 or the diaphragm support portion 336 may be integrally formed with the bonnet 206 as a unitary piece or structure. In other words, the diaphragm support portion 336 may extend from an inner surface 338 of the bonnet 206 and the retainer 332 may be eliminated.

Figure 5A:
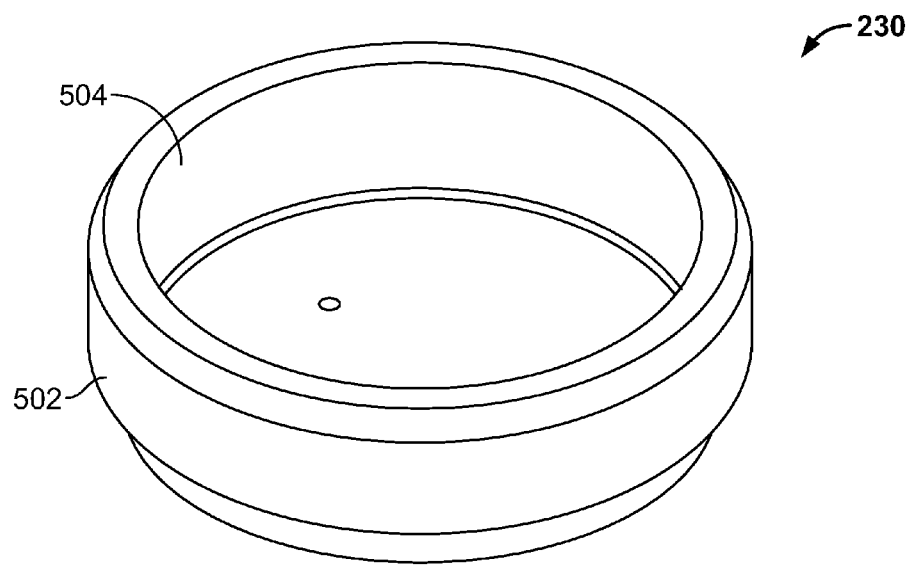
FIG. 5A illustrates an example diaphragm plate described herein of the example fluid regulator of FIGS. 2A, 2B, 3A and 3B.
Figure 5B:
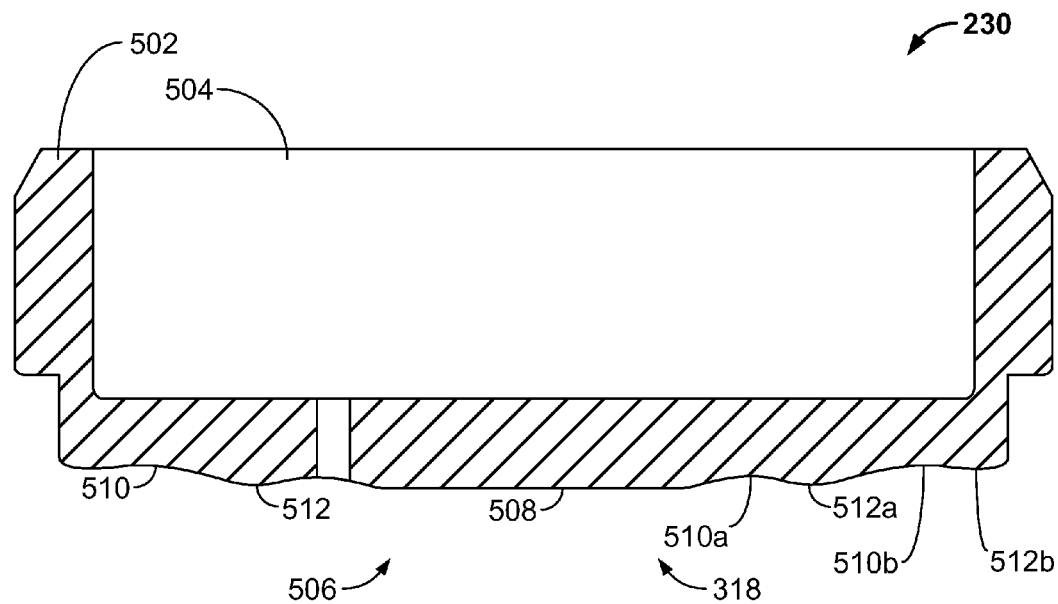
FIG. 5B is a cross-sectional view of the diaphragm plate of FIG. 5A.

FIGS. 5A and 5B illustrate the back-up plate 230 of the fluid regulator 200. Referring to FIGS. 2A, 2B, 3A, 5A and 5B, the back-up plate 230 includes the diaphragm interface or support surface 318 to engage and support the diaphragm 214. The back-up plate 230 has a cylindrical body portion 502 having a cavity 504 to receive the biasing element 232 of the load assembly 220. As shown, the diaphragm interface 318 includes a curved support surface or face 506 to increase a contact surface area between the diaphragm 214 and the back-up plate 230. In the illustrated example, the diaphragm interface 318 of the back-up plate 230 includes a substantially planar or flat engaging surface 508 to engage the central portion 304 (FIG. 3A) of the diaphragm 214.

The curved support surface or face 506 has a curved profile that is complementary to a profile of the portion of the diaphragm 214 that engages the back-up plate 320. In this manner, the curved support surface 506 provides a relatively greater contact surface area to engage the intermediate portion 306 or the contours 308 of the diaphragm 214. In the illustrated example, the curved support surface 506 includes a concave curved portion 510 adjacent a convex curved portion 512 to provide a smooth continuous wave-shaped curved support surface. In other words, the cross-sectional shape of the curved support portion 506 is substantially similar to the cross-sectional shape of the contours 308 of the diaphragm 214. For example, the concave curved portion 510 of the curved support surface 506 has a radius of curvature that is substantially similar to the radius of curvature of the convex portion 310 of the contours 308 of the diaphragm 214. Likewise, the convex curved portion 512 of the curved support surface 506 has a radius of curvature that is substantially similar to the radius of curvature of the concave portion 312 of the contours 308 of the diaphragm 214.

Also, a first concave curved portion 510a of the curved support surface 506 may have a radius of curvature that is different than, or similar to, a radius of curvature of a second concave curved portion 510b of the curved support surface 506. For example, the radius of curvature of the concave curved portions 510 may range between 6.0 and 8.0 millimeters. Similarly, a first convex curved portion 512a of the curved support surface 506 may have a radius of curvature that is different than, or similar to, a radius of curvature of a second convex curved portion 512b. For example, the radius of curvature of the convex curved portions 512 may range between 8.0 and 10.0 millimeters.

Thus, in contrast to the back-up plate 122 of FIG. 1A, the diaphragm interface 318 of the back-up plate 230 substantially matably engages the intermediate portion 306 of the diaphragm 214 to provide an increased contact surface area between the back-up plate 230 and the diaphragm 214 that affect (e.g., reduces) an amount of stress imparted to the intermediate portion 306 of the diaphragm 214 that moves in response to pressure changes in the sensing chamber 226. In this example, the diaphragm support surface 506 reduces localized stress concentrations on the diaphragm 214. For example, when the diaphragm 214 moves between the position shown in FIG. 2A and the position shown in FIG. 2B, the back-up plate 230 engages (e.g., matably engages) the intermediate portion 306 of the diaphragm 214 with a relatively great contact surface area. As a result, a reduction in localized stress concentrations significantly improves or increases the cycle life or fatigue life of the diaphragm 214.

In other examples, the diaphragm interface 318 of the back-up plate 230 includes a shape, profile or cross-section that is different than a shape, profile or cross-section of the diaphragm 214. For example, a radius of curvature between the curved support surface 506 and the contours 308 of the diaphragm 214 may be different such that the diaphragm 214 does not matably engage the back-up plate 230, but still provides an increased contact surface area relative to the back-up plate of FIGS. 1A and 1B.

Thus, the fluid regulator 200 described herein includes the diaphragm interfaces 314, 316 and/or 318, which may be configured to have a shape or profile that is substantially similar to the shape or profile of the diaphragm 214 to increase a contact surface area between the diaphragm interfaces 314, 316 and/or 318 and the diaphragm 214. For example, each of the diaphragm interfaces 314, 316 and/or 318 may include a respective curved surface or portion to increase a contact surface area when engaged by the diaphragm 214 to reduce stress concentration imparted to a portion of the diaphragm 214 that moves during operation. In some examples, a support surface of the diaphragm interfaces 314, 316 and/or 318 has a cross-sectional shape or profile that is substantially similar to the cross-sectional shape or profile of the diaphragm 214 such that the diaphragm interfaces 314, 316 and/or 318 matably engage at least a portion of the diaphragm 214. As a result, the diaphragm interfaces 314, 316 and/or 318 reduce stress concentrations imparted to the diaphragm 214, thereby increasing the cycle life or fatigue life of the diaphragm 214. For example, the cycle life of the diaphragm 214 is approximately 85,000 cycles while the life cycle of the diaphragm 112 of FIGS. 1A and 1B is approximately 10,000 cycles. In some examples, the fluid regulator 200 may be implemented with only one of the diaphragm interfaces 314, 316 and/or 318 or any combination of the interfaces 314, 316 and 318.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:
1. A fluid regulator comprising:
a valve body defining a fluid flow passageway between an inlet and an outlet;
a sensing chamber defining a portion of the fluid flow passageway;
a diaphragm to sense a pressure in the sensing chamber, the diaphragm having a peripheral edge clamped between the valve body and a bonnet of the fluid regulator, a central portion, and a movable portion positioned between the peripheral edge and the central portion, the movable portion having a plurality of convolutions formed prior to the diaphragm being positioned in the valve body and to move in response to pressure changes in the sensing chamber; and a diaphragm interface adjacent the sensing chamber and defined by the valve body, the diaphragm interface having a curved surface and a shoulder adjacent the curved surface, the curved surface shaped to matably receive at least one of the convolutions to affect an amount of stress imparted to the movable portion of the diaphragm during operation of the fluid regulator.

2. The fluid regulator of claim 1, wherein the diaphragm interface comprises a ring-shaped seat to hold the peripheral edge of the diaphragm-the ring-shaped seat having a ramp portion to contact the diaphragm.

3. The fluid regulator of claim 2, wherein the diaphragm interface further comprises a ring-shaped clamp positionable between the valve body and the bonnet to hold the peripheral edge of the diaphragm, and wherein a portion of the ring-shaped clamp projects inwardly from the peripheral edge of the diaphragm and contacts only one side of the movable portion of the diaphragm during operation of the fluid regulator.

4. The fluid regulator of claim 3, wherein the portion of the ring-shaped clamp and the ring-shaped seat are to contact opposing faces of the movable portion of the diaphragm during operation of the fluid regulator.

5. The fluid regulator of claim 1, wherein the diaphragm interface further comprises a diaphragm backup-up plate, and wherein a first face portion of the diaphragm back-up plate has a curved profile complementary to a profile of the movable portion of the diaphragm and a second face portion adjacent the first face portion having a non-curved profile portion complementary to a profile of the central portion of the diaphragm, the first face portion to matably receive the movable portion of the diaphragm and the second face portion to support the central portion of the diaphragm.

6. A fluid regulator of claim 1, wherein the curved surface is to increase a contact surface area between the diaphragm interface and the movable portion of the diaphragm.

7. A fluid regulator, comprising:
a diaphragm to be disposed between a valve body and a bonnet, the diaphragm having a central portion, a peripheral edge and a movable intermediate portion disposed between the central portion and the peripheral edge, each of the peripheral edge and the central portion has a planar surface, and the intermediate portion has a plurality of convolutions formed prior to assembling the diaphragm to the valve body and the bonnet, the convolutions to increase a sensitivity of the diaphragm; and
a retainer ring removably coupled to the fluid regulator and to be clamped between a shoulder of the bonnet and a shoulder of the valve body, the retainer ring having a diaphragm clamping portion adjacent a diaphragm support portion, the diaphragm clamping portion to clamp the peripheral edge of the diaphragm to the fluid regulator, the diaphragm support portion configured to support the intermediate portion of the diaphragm, the diaphragm support portion having a curved surface shaped to matably receive at least one of the convolutions to increase a contact surface area between the diaphragm support and the intermediate portion of the diaphragm during operation.

8. A fluid regulator of claim 7, further comprising the valve body, the valve body having a diaphragm mount adjacent an inner surface that at least partially defines a sensing chamber, wherein the valve body has an angled surface between the diaphragm mount and the inner surface, the angled surface extending away from the diaphragm mount and on an opposite face of the diaphragm from the retainer ring.

9. A fluid regulator of claim 7, wherein the diaphragm support portion extends away from the diaphragm clamping portion and the face of the diaphragm.

10. A fluid regulator of claim 9, wherein the retainer ring is to transfer a load to the peripheral edge of the diaphragm when the valve body is coupled to the bonnet.

11. A fluid regulator of claim 7, further comprising a back-up plate having a support surface to engage the face of the diaphragm.

12. A fluid regulator of claim 11, wherein the support surface of the back-up-plate includes a central portion having a planar surface and an outer portion adjacent the central portion, the outer portion having a wave-shaped contour to matably receive at least one of the convolutions of the intermediate portion of the diaphragm when the diaphragm is in engagement with the outer portion.

13. A fluid regulator of claim 12, wherein the central portion of the back-up plate is to engage the central portion of the diaphragm, and the wave-shaped contour of the back-up plate is to engage at least one of the convolutions of the intermediate portion of the diaphragm adjacent the central portion.

14. The fluid regulator of claim 12, wherein the wave-shaped contour of the back-up plate includes a radius of curvature that is to matably receive at least one of the convolutions of the intermediate portion of the diaphragm.

15. A fluid regulator, comprising:
means for regulating fluid flow through a fluid flow passageway of the fluid regulator, the means for regulating fluid flow includes a diaphragm composed of a metallic material having a plurality of convolutions formed onto a movable portion of the diaphragm prior to positioning the diaphragm in the fluid regulator; and
means for retaining removably coupled to the fluid regulator and to be clamped between a shoulder of a valve body and a shoulder of a bonnet, the means for retaining having means for clamping to clamp a peripheral edge of the diaphragm to the fluid regulator and means for reducing stress concentration imparted to the movable portion of the diaphragm during operation, the means for reducing stress concentration having a shape configured to matably receive at least one of the convolutions.

16. A fluid regulator of claim 15, wherein the means for reducing stress includes means for increasing a surface contact area between the movable portion of the diaphragm and the means for reducing stress.

17. A fluid regulator of claim 1, further comprising a rounded edge to contact the diaphragm on a face of the diaphragm, the rounded edge opposite the curved surface of the diaphragm interface.

18. A fluid regulator of claim 2, wherein the ramped portion comprises a rounded edge.

19. A fluid regulator of claim 8, wherein the angled surface has a rounded edge to contact the diaphragm on a face of the diaphragm opposite the retainer ring.

* * * * *